United States Patent [19]
Durand et al.

[11] Patent Number: 5,694,598
[45] Date of Patent: Dec. 2, 1997

[54] METHOD FOR MAPPING DATA BETWEEN A RELATIONAL FORMAT AND AN OBJECT-ORIENTED FORMAT

[75] Inventors: Jacques Durand, Louisville, Colo.; Murthy Ganti, Plainsboro, N.J.; Ricardo Salinas, Superior, Colo.

[73] Assignee: U S WEST Technologies, Inc., Boulder, Colo.

[21] Appl. No.: 321,714

[22] Filed: Oct. 12, 1994

[51] Int. Cl.⁶ .......................... G06F 17/30; G06F 13/00
[52] U.S. Cl. .......................... 395/614; 395/611; 395/612
[58] Field of Search .......................... 395/600, 400, 395/700, 413, 614, 611, 612; 364/242.94, 243, 280, 282.1, 222.81

[56] References Cited

U.S. PATENT DOCUMENTS

| | | | |
|---|---|---|---|
| 4,205,371 | 5/1980 | Feather | 395/612 |
| 5,239,647 | 8/1993 | Anglin et al. | 395/621 |
| 5,263,167 | 11/1993 | Conner, Jr. et al. | 395/604 |
| 5,291,583 | 3/1994 | Bapat | 395/500 |
| 5,386,557 | 1/1995 | Boykin et al. | 395/601 |
| 5,426,747 | 6/1995 | Weinreb et al. | 395/413 |
| 5,442,779 | 8/1995 | Barber et al. | 395/604 |
| 5,448,726 | 9/1995 | Cramsie et al. | 395/614 |
| 5,459,860 | 10/1995 | Burnett et al. | 395/612 |
| 5,499,371 | 3/1996 | Henninger et al. | 395/702 |

*Primary Examiner*—Paul V. Kulik
*Assistant Examiner*—Greta L. Robinson
*Attorney, Agent, or Firm*—Brooks & Kushman P.C.

[57] ABSTRACT

A first method is disclosed for mapping data from a plurality of objects to a relational database. The method begins with the step of generating a transit object and its structure (TO_schema, dataGraph and dataBlocks). The next step of the method is populating the transit object based on the data of the plurality of objects. The method continues with the step of transmitting the transit object from the client object broker (COB) to the server object broker (SOB) using a communication server. The method next includes the step of populating a data structure based on the dataBlock object. The method concludes with the step of populating the relation&l database based on the data structure. A second method is also disclosed for mapping data from a relational database to a plurality of objects.

10 Claims, 8 Drawing Sheets

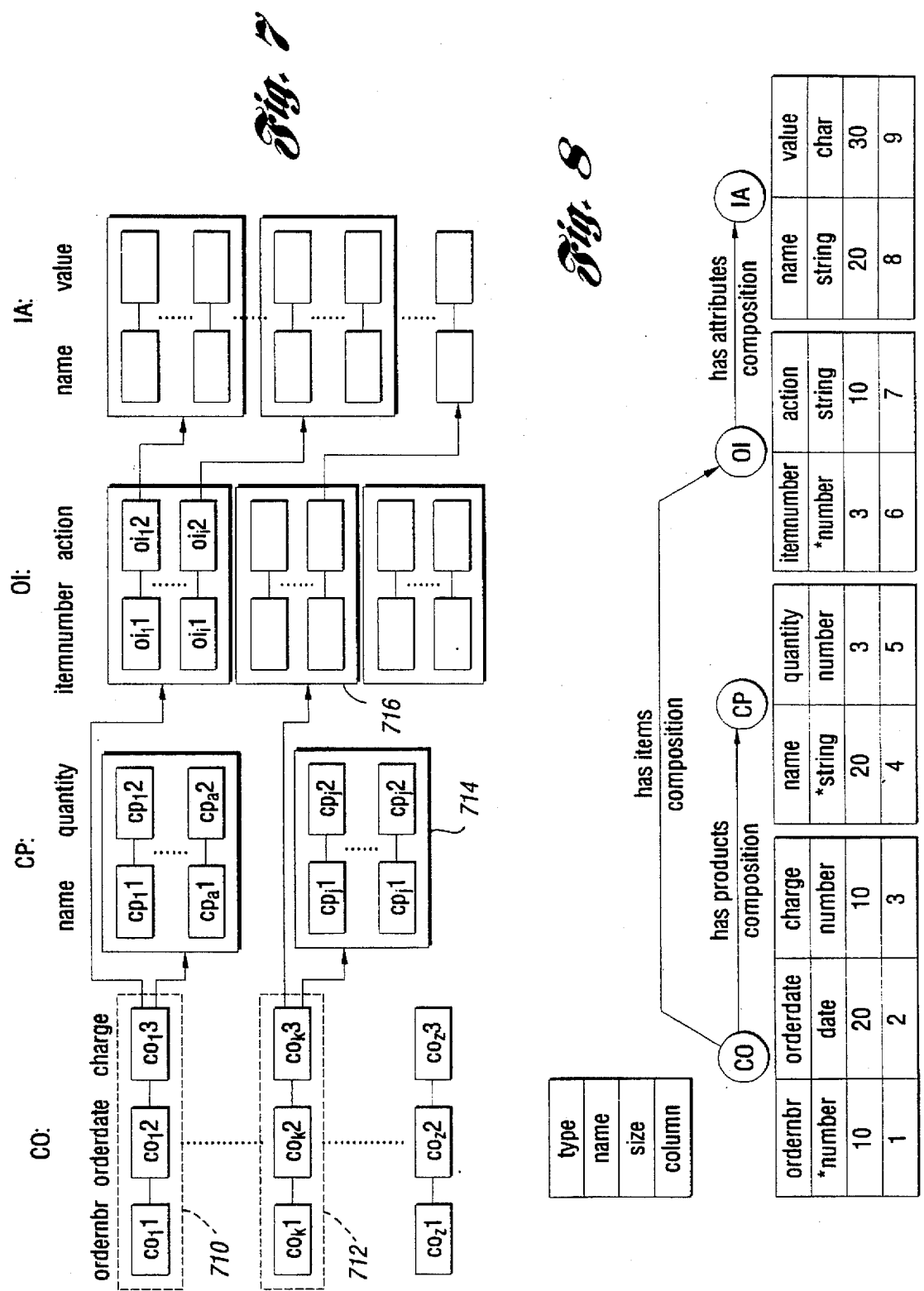

METHOD FOR MAPPING DATA BETWEEN A RELATIONAL FORMAT AND AN OBJECT-ORIENTED FORMAT

TECHNICAL FIELD

This invention relates generally to mapping data between two standard data models. In particular, this invention relates to methods for mapping data between an object-oriented data model and a relational data model.

BACKGROUND ART

The relational database model was introduced in the early 1970's by E. F. Codd. Since then, the relational model has become the model employed by most commercial database management systems (DBMS).

Data in a relational database is represented as a collection of relations. Each relation can be thought of as a table.

Like the relational database model, object-oriented programming ("OOP") has also existed since the early 1970's. In the early 1990's, object-oriented programming gained widespread acceptance due to increased power of workstations, proliferation of graphical user-interfaces and the development of hybrid object-oriented languages such as C++.

The OOP paradigm provides a class construct which combines data and procedural abstractions. The definition of a class includes a definition of the storage requirements of the class as well as the procedures which define how objects of the class behave.

An object is an instance of a class. Every object includes the data and procedural characteristics of its class. In addition, new .objects inherit the storage and functionality defined by all classes used to define the parent of the object.

The present proliferation of relational DBMSs coupled with the increasing popularity of the OOP paradigm has resulted in a desire to map data between data models. In particular, it is desirable to access relational databases in OOP applications, and to access object-oriented data from within a relational DBMS.

Commercial tools currently available for mapping object-oriented data to relational DBMSs include Persistence, ROCK Phase II, and ObjectStore. These tools are primarily intended to allow application objects to be persistent. Further, these applications typically assume a straight mapping correspondence between application objects and a database schema.

Various approaches have been considered for object-relational integration. In most approaches, the purpose has been to interface object-oriented applications with relational data storage. These approaches include:

The embedded database interaction in which the interaction is controlled directly by the methods of the object class (e.g. using embedded SQL). This approach makes the object-oriented application rather tightly coupled to the data-storage technology. It is well suited to code generation techniques when the mapping is straightforward. Persistence is one commercial product incorporating this approach.

The import-export approach uses an external module which is invoked as a conversion facility for objects. This approach has been used for conversions between relational and object databases. It can be used for providing persistence and object views to object-oriented applications. The import-export module acts as an external object server. Although the functional coupling is loose, the module requires information regarding the models on each end and must maintain the consistency of its representations.

The SQL gateway is a query server, which is more flexible than the import-export approach. In its simplest version, the object methods encapsulate some parameterized SQL statements and invoke the gateway to handle them. The SQL gateway does the conversion between the relational form of the data and some convenient host representation such as an array or primitive object. The SQL gateway can be encapsulated in a single class that is inherited by any other application object class.

The helper class can be associated with each class of an application. The helper class includes methods which store/retrieve data. An inheritance relationship between the object class and its helper is not required. A handle on the object is passed to the helper which is directly manipulated itself as a separate object.

Each prior art solution has advantages and disadvantages that must be weighted depending on the requirements in the following areas:

Flexibility: The solution should provide independence from the storage technology;

Composability: The mapping operations and operators should be easy to combine, since requests may concern aggregations of objects such as collections and compositions hierarchies;

Security: The solution should prevent the application designer from accessing the database in an unauthorized or inefficient way;

Evolution: The mapping technique should be flexible with regard to changes in the domain object-oriented model, in the database schema and in the physical organization; and "Design overhead": The mapping solution should limit the complexity added to the application object model.

DISCLOSURE OF THE INVENTION

A need therefore exists for an improved method for mapping data between an object oriented format and a relational format. More particularly, a need exists for a method for mapping data between an object oriented format and a relational format which provides an application with not only a facility for making objects persistent but also a facility for populating objects with data from existing relational databases.

The present invention described and disclosed herein comprises a method for mapping data between an object oriented format and a relational format which satisfies these needs.

It is an object of the present invention to provide a method for mapping data between an object oriented format and a relational format using a transit object transmitted between an object-oriented client application and a data server managing relational databases.

It is another object of the present invention to provide a method for mapping data between an object oriented format and a relational format which accommodates various levels of granularity of the data flow.

It is yet another object of the present invention to provide a method for mapping data between an object oriented format and a relational format which makes the application code independent from the database language, thus being transparent to the client application.

In carrying out the above objects and other objects of the present invention, a first method is provided for mapping data from a plurality of objects to a relational database. The method is intended for use in a data processing system which includes a processor, a memory, a client object broker ("COB"), a communication server and a server object broker ("SOB").

The method begins with the step of generating a transit object. The transit object is a complex data structure that is comparable to a small size database. The implementation name Of a TO is a "dataGraph". A dataGraph contains at least one "dataBlock".

The method continues with the step of populating at least one dataBlock object of the transit object based on the data of the plurality of objects. Next, the method includes the step of transmitting the transit object from the COB to the SOB using the communication server.

The method further includes the step of populating a data structure based on at least one dataBlock object. The method concludes with the step of populating the relational database based on the data structure.

In carrying out the above objects and other objects of the present invention, a second method is provided for mapping data from a relational database to a plurality of objects. The second method begins with the step of generating in the memory a transit object. The transit object includes at least one dataBlock object.

The method continues with the step of generating in memory a data structure. The method also includes the step of populating the data structure based on the data of the relational database. The method further includes the step of populating at least one dataBlock object of the transit object based on the data structure.

Next, the method includes the step of transmitting the transit object from the COB to the SOB using the communication server. Finally, the method concludes with the step of populating at least one object based on at least one dataBlock object.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein:

FIG. 7 is a block diagram illustrating the contents of a TO associated with the typical object class hierarchy;

FIG. 8 is a block diagram illustrating the TO-schema of the TO associated with the typical object class hierarchy;

FIG. 10 is a block diagram illustrating a collection of objects to be mapped to a TO;

FIG. 11 is a flowchart illustrating the steps of the process to map a collection of objects to a TO;

FIG. 12 is a flowchart illustrating the steps of the process to populate an application object from a TO;

FIG. 14 is a diagram illustrating the result of an SQL retrieval and a corresponding TO.

DETAILED DESCRIPTION

Figure 1:
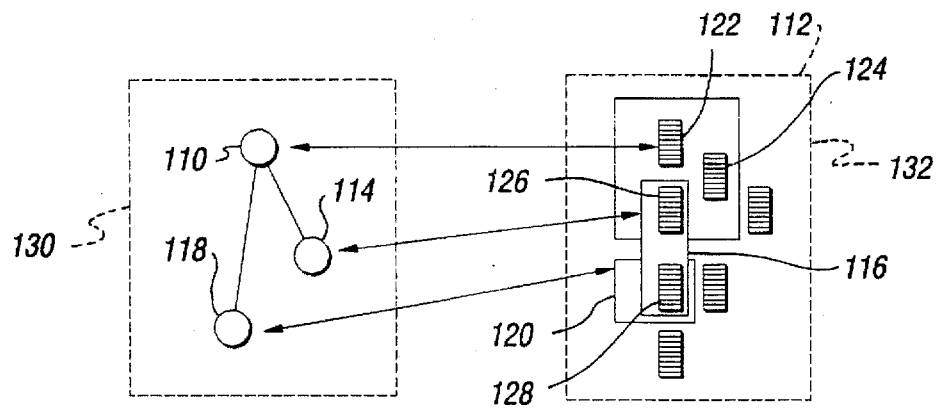
FIG. 1 is a schematic block diagram illustrating a many-to-many mapping between object classes and relational tables.

Referring now to the drawing figures, there is illustrated in FIG. 1 a typical many-to-many mapping between object classes and relational tables which can be handled using the present invention. Data of object class 110 maps to the relational tables of group 112. Group 112 includes relational tables 122, 124 and 126.

Data of object class 114 maps to the relational tables of group 116. Group 116 includes relational tables 126 and 128. As illustrated, relational table 126 belongs to both group 112 and group 116.

Data of object class 118 maps to the relational tables of group 120. Group 120 consists of relational table 128. Relational table 128 also belongs to group 116.

Figure 2:
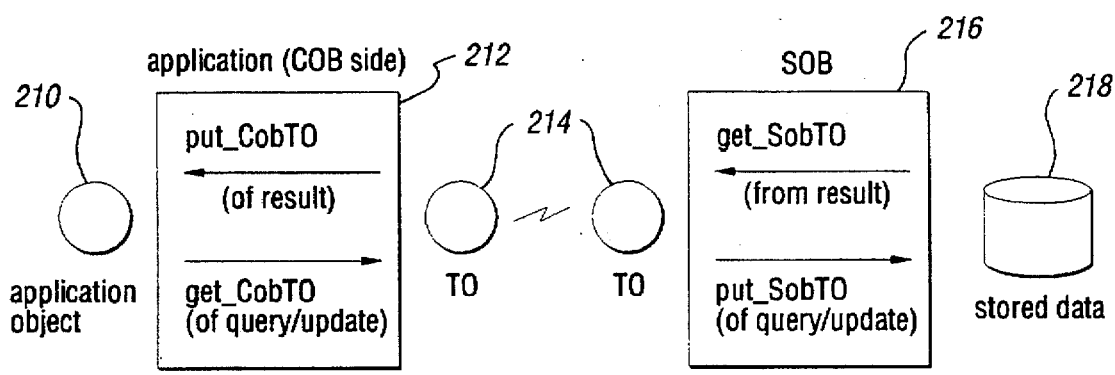
FIG. 2 is a schematic block diagram illustrating the architecture employed by the present invention.

Referring now to FIG. 2, there is illustrated a schematic block diagram of the distributed architecture employed by the present invention. The architecture is divided into two sides. The first side is an application side referred to as a client object broker ("COB") 212. COB 212 is an object-oriented application which uses data stored in application object 210.

The second side of the architecture is a data server side referred to as a server object broker ("SOB") 216. SOB 216 is a relational server which is responsible for relational data stored in database 218.

The mapping process of the present invention is distributed on both sides of the client-server architecture. Each side performs a portion of the mapping. The intermediate form of the data between the two sides is Transit Object ("TO") 214.

When circulating over the network, the data is in TO form. The mapping operations of COB 212 are get__CobTO and put__CobTO. The mapping operations of SOB 216 are get__SobTO and put__SobTO.

Client-Server Considerations

Security: In an object client-server architecture, security is a major concern. The application access to the database has to be restricted. For this reason, as well as for the sake of independence from the storage technology, no direct SQL capability should be made available to the application. This restriction can also be extended to read only transactions since there is a need to control the cost of databases transactions at a server level. In other words, the Object Server has a control over both content and processing of the database access.

Transaction granularity: various levels of granularity in database interaction should be accommodated (e.g. single attribute update as well as a transaction on an entire aggregation/collection of objects), and not restricted to object units. This is especially important when it comes to optimize the data flow as well as the number of transactions that is handled by a data served (and therefore its performance). Such scalability of requests for manipulating parts of objects as well as aggregations/collections of objects requires an interface more flexible than an import/export module.

Source transparency and Client transparency: An object server is a piece of network infrastructure that should neither depend too heavily on its data sources, nor have its code depend on the applications objects it serves. In other words, there should not be any shut down of the server or recompiling/relinking of its code when changing the database or its content, or when adding a new application. Tasks such as switching to another database or changing the database interface can be handled at run-time, and the code of the server is totally application independent.

Object services: one can expect an object broker or an object server to provide some services, especially in a multi-user context, like object caching, locking, or notification based on events related to objects (e.g. an 'object' X has been checked out by the application Y). Such services require the data to be already in some structured form when handled by the broker.

In addition, there should be an 'object' ID for this intermediate form of data. However, if one wants to keep the object broker independent from the applications, the code of the intermediate data structure should be independent from any application object model. Only the content should be allowed to depend on the application model.

Similarly, the notion of an ID for the intermediate data structure should not be related to the address space of an application, and rather have a scope spanning several applications. This is required if one wants the services mentioned above to be provided for both multi-user applications and for multiple applications sharing data.

Figure 3:
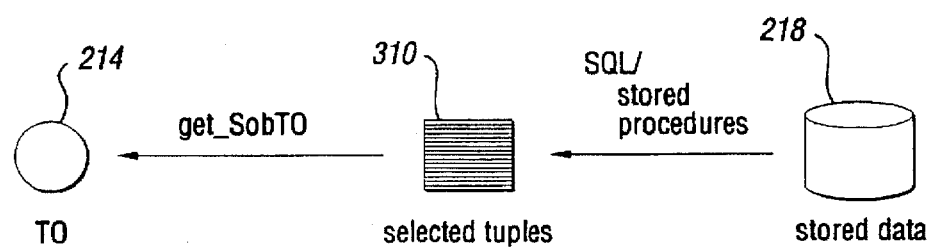
FIG. 3 is a schematic block diagram illustrating a query of a relational database.

Referring now to FIG. 3, there is illustrated a query of relational database 218. On the SOB 216 side, get_SobTO, a stored procedure, is invoked by a query processor and returns the query result into an array of tuples 310.

Figure 4:
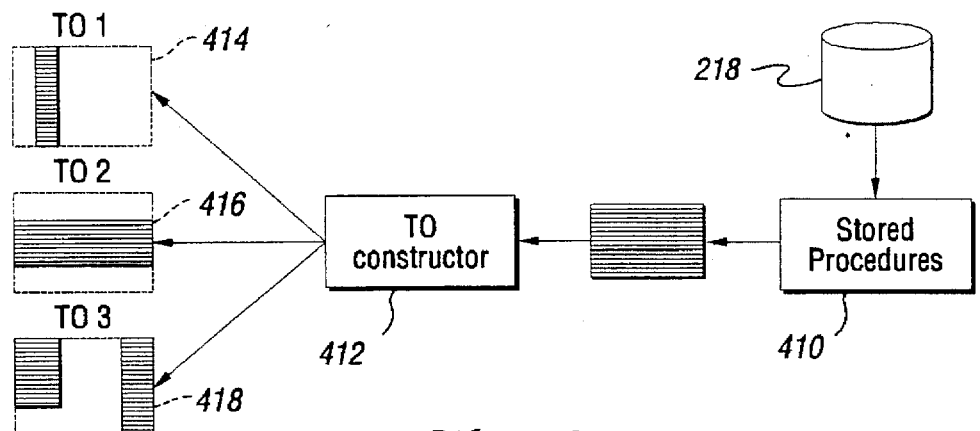
FIG. 4 is a schematic block diagram illustrating a constructor used for producing a customized relational query result.

A TO constructor 412 can be implemented as shown in FIG. 4. The TO constructor 412 is used for producing a customized relational query result.

Associated with the stored procedure call is a specification called a TO-schema. The TO-schema describes how to structure the result of the query. The TO-schema, for example, describes how to generate the resulting TO. The TO, therefore, reflects processing in addition to the SQL retrieval of the data.

A default TO-schema is associated with each stored read-procedure 410 in the SOB 216. Each application, however, can override the default TO-schema when sending a request, thus customizing the result of the stored procedure.

As shown in FIG. 4, TO constructor 412 customizes the default TO schema into TO1 414, TO2 416 and TO3 418.

Note that the SOB 216 does not reflect any knowledge of a specific application model. In fact, a single SOB 216 can serve many object models. The TOs are implemented as instances of a single object class called DataGraph which is orthogonal to any object of an application specific domain model.

The structure of the DataGraph's contents can be customized for specific client objects in order to match the object's structure. This aspect of the mapping is comparable to the SQL gateway solution.

On the COB 212 side, put_CobTO rebuilds the resulting TO and makes the data available through the Persistent Object class. The Persistent Object class is inherited by all persistent object classes of the COB application.

The TO is then accessed by the object class which initiated the request or by the iterator of a corresponding collection class in case the DataGraph is expected to contain several objects of same type.

Since the TO is a customized form of the retrieved data, its structure is already much closer to the application object than, for example, the set of tuples resulting from a complex relational join. The TO data must then be assigned to one or several objects of the application.

At this point, several options are available to locally convert the TO. The preferred embodiment embeds the conversion task into each application object class. By handling a standardized intermediate object such as the TO, the inconvenience of embedding queries and structures that are specific to a specific database technology is avoided.

Figure 5:
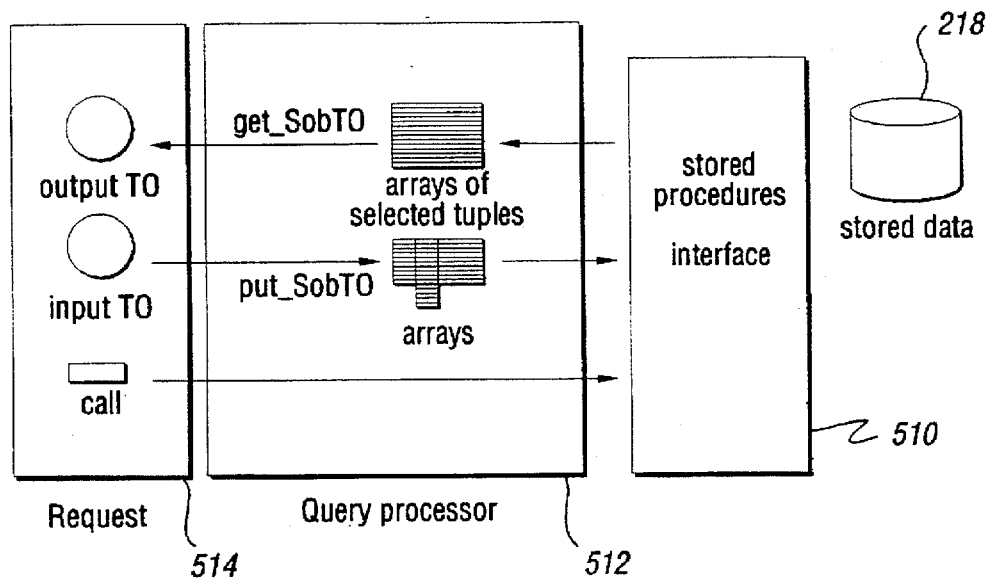
FIG. 5 is a schematic block diagram illustrating the elements of the SOB.

Referring now to FIG. 5, there is a more detailed illustration of the elements of the SOB 216. As shown at 514, an application call is placed to the DBMS. The stored procedures 510 of the DBMS process the call. In the preferred embodiment, the call associated with a request does not necessarily use the name of the stored procedure. The call uses a surrogate name that is mapped to the name of the stored procedure by the query processor 512 of the SOB 216.

If the call is a request to retrieve relational data, the stored procedures 510 produce an array of selected tuples from the stored data 218. The query processor 512 then invokes get_SobTO to produce an output TO as shown at 514.

If the call is a request to store relational data, the query processor produces a set of arrays using put_SobTO. The stored procedure 510 then extract the data from the arrays and store the data at 218. As shown at 514, two TOs are actually associated with each request: an input TO and an output TO.

Figure 6:
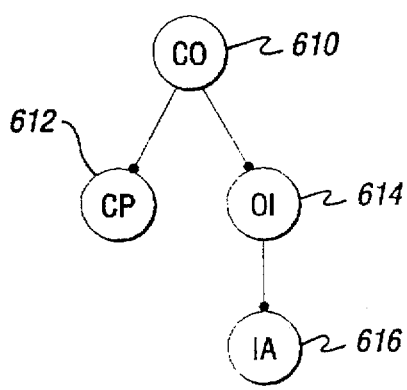
FIG. 6 is a schematic diagram illustrating a typical object class hierarchy.

Referring now to FIG. 6, there is illustrated a typical object class hierarchy. The example hierarchy is used to describe a customer order CO 610. The CO 610 is composed of at least one customer product CP 612 and of at least one order item OI 614. Each OI 614 is composed of at least one item attribute IA 616.

Referring now to FIG. 7, there is a block diagram illustrating the contents of the TO associated with the example class hierarchy shown in FIG. 6. A TO that maps to an object of class IA 616 contains a list of two elements: name and value.

A TO that maps to an object of class OI 614 contains a list of two elements: item number and action. Such a TO must also include a reference to a list of lists having the form: name and value—one for each IA 616.

A TO that maps to an object of class CO 610 contains a list of three elements: number, order date, and charge. A TO that maps to CO 610 must also include two references to lists of lists. The first reference points to a list of CPs 612. The second reference points to a list of OIs 614.

Finally, a single TO could hold a collection of COs 610. Each CO 610 being represented with its components as previously described.

Ad-hoc persistence operations can also be handled through TOs. An object can build a customized TO for one or a group of its attributes, therefore avoiding the use of standard TOs associated to its class.

A list of values that holds the attribute values of an object is called its datalist 710. The TO shown in the FIG. 7 contains z CO datalists. The $k^{th}$ of these CO datalists 712 refers in turn to a list of CP datalists 714 and to a list of OI datalists 716.

The $cp_j2$ element represents the value of the second attribute ("quantity") of the first CP object that is part of the $k^{th}$ CO object stored in this TO. The index j means that this datalist is the $j^{th}$ of the CP datalists.

The example illustrated in FIG. 7 shows that a single TO can store the data of one or several objects of any type, as well as hierarchies of objects of various types, or even a collection of such hierarchies.

It further shows that the only data structure that is needed for representing TO data is a tree-like structure, each node of which is a list of lists (or a set of lists) of values.

The TO-schema

In the previous examples, the TO closely matches the object data and its composition hierarchy. One can, however, build a TO from an object where the TO structure does not closely reflect the object structure.

For example, one could eliminate some attributes, eliminate some components, or add some attributes in the TO that were hot in the original object. One could also reorganize the object data by flattening all its data, or introduce some additional hierarchy. Tracking all these modifications is greatly facilitated if the TO contains some meta-information.

In addition to the tree-like structure that holds its TO-data, a TO also contains its own data model known as a TO-schema. FIG. 8 illustrates the TO-schema of the previously discussed TO. The TO-schema contains: TO-entities, TO-relationships and TO-attributes.

A TO-entity contains TO-attributes of different types. A TO-entity has instances, each of which is represented as a datalist.

TO-relationships are oriented, binary relationships. A TO-relationship relates a TO-entity, called the domain TO-entity, to another TO-entity, called the range TO-entity, in an oriented way. A TO-relationship is described by: (1) its name, (2) a type (e.g. "association", "composition", "inheritance"), and (3) its domain and range TO-entities.

At the TO-data level, a TO-relationship is a many-to-many relationship between datalists. It can be represented by associating to each datalist of the domain TO-entity, a reference to a group of datalists that are instances of the range TO-entity.

Each TO-attribute of a TO-entity is described by: (1) a name, (2) a type, and (3) a maximum size in bytes. Optionally, a TO attribute can by described by (4) a flag indicating whether the attribute can be considered as part of the identifier for the datalist in which it is contained, and (5) a coordinate slot that is used for mapping the TO from or to a multi-array data structure. Such a slot can be used to store index information such as a column number.

TO-entity Instances

The preferred embodiment implements a TO two ways depending on the representation of the TO-data. The first method is based on arrays. The second method is based on lists.

The array-based implementation assigns a one-dimensional array to each TO-attribute. The array holds its instances for all TO-entity instances. The grouping of the different TO-attributes of a TO-entity can in turn be done by chaining the one-dimension arrays into a list or into a bi-dimensional array.

The advantage of the array-based implementation is that it facilitates the memory allocation in cases where the size of the TO is known or bounded in advance. In addition, it provides control over the memory allocation. For example, one can decide to allocate these arrays in such a way that all the instances of a TO-attribute are contiguous in memory. This facilitates the transfer of TO-data using communication primitives such as RPC calls.

The list-based implementation assigns a list to each TO-entity instance (i.e. to each datalist). Therefore, it actually implements the datalist. Each element of the list, however, is actually a pointer to the value of the element. Thus, such a list can be heterogeneous having elements of different sizes.

The instances of a TO-entity can then be grouped by using a list, each element of which is a pointer to an instance-list. The advantage of this representation is that the instances of a TO-entity can be easily updated, removed, or inserted.

TO-relationship Instances

The implementation of a TO-relationship requires some means to associate a TO-entity instance to zero, one or several other TO-entity instances. A TO-relationship is implicitly considered as an oriented, binary, many-to-many relationship. Given a TO-relationship $r_{12}$ from a TO-entity $e_1$ to a TO-entity $e_2$, we call "$r_{12}$-reference" the link from an instance of $e_1$ to an instance of $e_2$.

There are two ways to represent an r-reference: (1) by using a list of pointers to the referenced datalists, or a list of indices to the arrays entries that correspond to the referenced datalists, or (2) by using two indices that represent an index range in an array.

The latter representation assumes that the referenced datalists are consecutively stored, which means that they can be identified by a single interval of indices. If this is the case, we call this property the "index density property" (IDP). Although the IDP poses some constraints on the way the TO is built, it allows for an implementation of references that spares memory and speeds up the access to the referenced datalists.

Current Implementation

Favoring flexibility in memory allocation and TO updates over control, the current implementation of TOs uses a list-based representation for TO-data. The current implementation is intended to handle relational data that results from SQL queries that perform joins across tables.

The mapping process can guarantee that the referenced datalists be consecutively stored in the list of instances of a TO-entity. Therefore, a pair of indices will suffice for each r-reference.

To provide system independence, the elementary types of values in the datalists are limited to strings of characters. Thus, some conversion, such as string to numeric, may need to take place when mapping to and from TOs.

Figure 9:
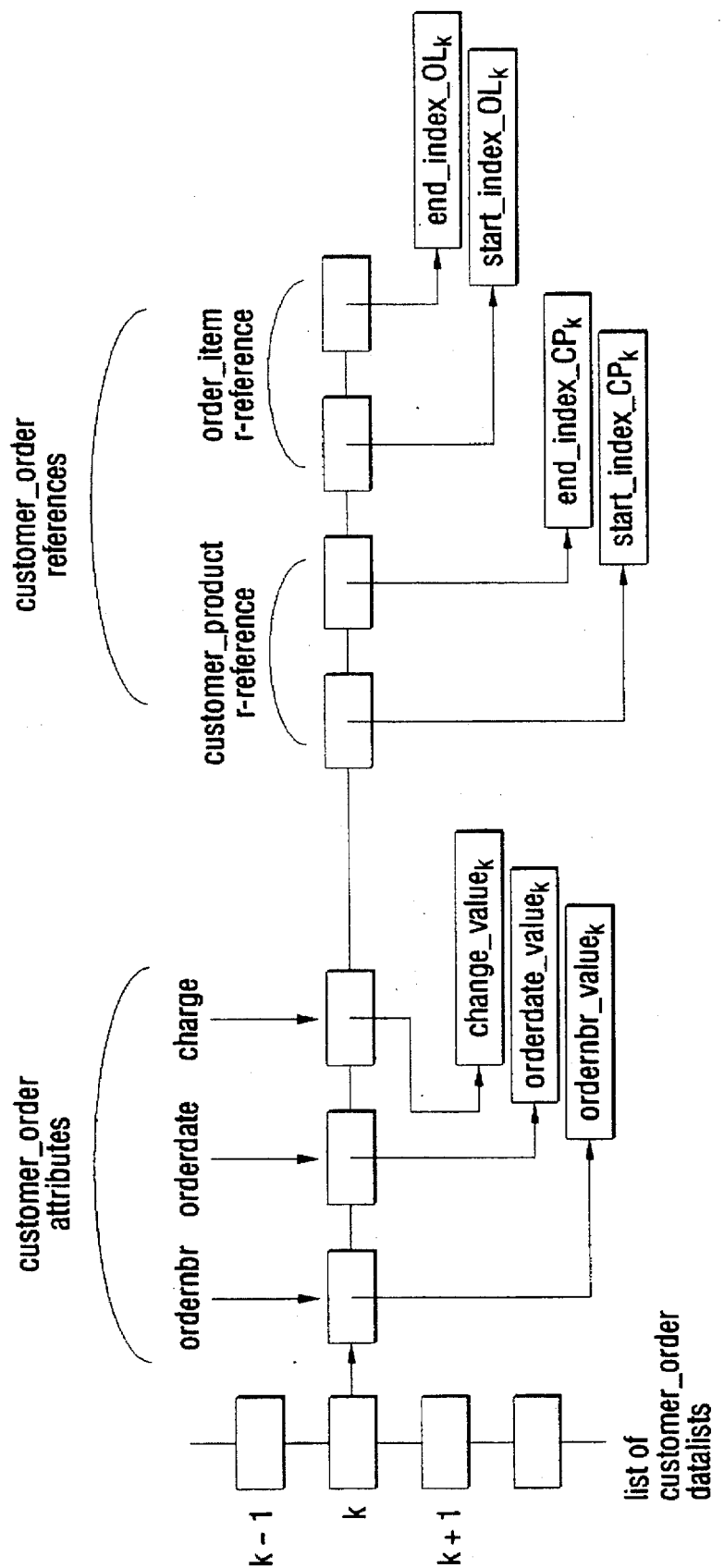
FIG. 9 is a block diagram illustrating a list-based implementation of a datalist and references of the present invention.

The implementation of a datalist that is an instance of the CO class, including its two r-references, one to CP, the other to OI, is represented in FIG. 9.

A C++ Implementation

Three major C++ classes can be used to handle TOs: dataGraph_info, dataGraph, and dataBlock.

The objects of the dataGraph_info class contain a description of the TO-schema as illustrated in FIG. 8. Such a TO-schema description can be read from a text file. Appendix A illustrates the preferred format of such a text file.

A dataGraph_info object can be dynamically extended by adding a new TO-entity and connecting it through a TO-relationship to an existing one. The class description of Appendix B defines a dataGraph_Info class.

The main class for TOs is called dataGraph. An instance of dataGraph actually represents a TO. One constructor of dataGraph requires a dataGraph_info object as input.

Once the dataGraph object is built by this constructor, it contains a representation of the TO-schema with empty TO-data. The main difference between such an "empty" dataGraph object and the corresponding dataGraph_info object is that the former is a sort of "compiled" version of the latter, and therefore less easily updatable.

A dataGraph object is actually composed of a list of other objects that are instances of the dataBlock class. A dataBlock object represents a TO-entity (schema level description) and its instances such as the list of CO datalists, as illustrated in FIG. 9.

For example, in our example of TO as illustrated in FIG. 7, there would be four dataBlock objects in the dataGraph object that represents this TO. When creating an "empty" dataGraph object from a dataGraph_info object, the TO-relationships are interpreted as connections between "empty" dataBlock objects, thus ordering them as a tree.

Mapping to and from the transit object

An application that needs to make object data persistent by saving it into a database has the responsibility to build its own TOs. In other words, the persistence methods of an object should map to and from TOs.

There might be several TOs corresponding to an application object. A common case of such multiple TOs associated to a same object occurs when there is a need for several persistence methods. For example, one for the core part of the object, another for the object and all its components.

In the first case, a TO with one TO-entity is sufficient. In the second case, a TO with a more complex TO-schema is required such as the one illustrated in FIG. 8.

In the preferred embodiment, an application object class should include a classID. A classID is an integer made accessible as a class member by any instance of this class.

There are generally three activities an application must complete to make an application object persistent by using TOs. First, the application must build an empty TO or dataGraph object and access the part of this TO to be populated (e.g. the dataBlock object of interest). Next, the application must populate the dataBlock object. Finally, the application must send the dataGraph object to a communication server, after having converted it into a communication format.

Create the dataBlock(s)

A persistence method must first create a dataGraph object, unless the constructor of the object has already built all the empty dataGraph objects that are to be used by persistence methods. It is assumed that the method or the constructor has access to a dataGraph_info object, that can be a class member of this application object class (i.e. instance independent), Upon invocation of a persistence method, the method must access, inside the dataGraph object, the dataBlock object that pertains to the data to be transferred. In C++, this can be done by using two methods:

int dataGraph::GetDBindex(int class ID)

and dataBlock* dataGraph::Get_dataBlock(int i)

The first method returns an index in the list of dataBlock objects that are components of a dataGraph object. The index identifies the dataBlock object that corresponds to the classID argument. The second access method returns the actual dataBlock object given the index.

Populate the dataBlock(s)

Once the dataBlock object is accessed, the method must build a datalist in it. Three basic methods handle this task:

int dataBlock::OpenTuple();

/* create and open a datalist for this dataBlock: a list of n+2*r slots is created, n being the number of datalist attributes, r the number of references from this dataBlock. */ int dataBlock::AddSlotToTuple(char *valueptr);

/* add an element to the currently open datalist, i.e. set the next current slotpointer to valueptr */ int dataBlock::CloseTuple();

/* close the datalist and append it as a new item in the list of datalists of the dataBlock. Return its index */

Note that the method must be implemented with knowledge of the position at which each attribute must be stored in the datalist. An application object method that uses the three basic dataBlock methods above is called a TO-write method.

Transmit the dataGraph

Finally, the persistence method must transmit the TO over a communication channel. This could be done by subclassing the dataGraph class in order to add some communication methods such as by multiple inheritance.

The dataGraph class provides a standard ASCII conversion, the protocol of which is illustrated in Appendix C.

The methods that map a TO to and from the ASCII form are:

string dataGraph::FormatToASCII();

Int dataGraph::CreateFromASCII(string datatext);

/* this method populates a dataGraph object initially created as empty, the dataGraph may have been created by a constructor without dataGraph_info argument */

Mapping a collection of objects to a TO

A persistence method for mapping a collection class to a TO is slightly more involved. The persistence method must get the dataBlock object that is related to the collection class of application objects. For each element of the collection class, the persistence method must call a TO-write method of the element class that creates one datalist and adds it to the dataBlock object. Finally, the persistence method must transmit the dataGraph.

Mapping a composition hierarchy to a TO

Consider the previous example of a Customer_Order composition hierarchy. Each CO object may have several collections of components of different types. Further, each component may have sub-components.

In this case, each CO has customer_product and order_item components. In such a case, the object is going to map itself by performing a recursive traversal of its components. Each component is responsible for calling the TO-write method of its immediate sub-components.

Before adding a datalist $d_x$ to the dataBlock object corresponding to a composed object x, each r-reference in $d_x$ that corresponds to each type of component for object x must be set up. Since the number of components of each sort is not known, the TO-write methods of these components collections must first return the actual number of each sub-collection. For example, for a given CO object x, it may not be explicit how many CP objects and how many OI objects are contained in x.

Setting the r-references of a datalist can be handled by the following methods:

```
int dataBlock::SetRefTuple( char *refname, int ref1,int
    ref2);
/*in the currently open datalist, set the slots of the
    reference "refname" to ref1 and ref2*/
int dataBlock::SetRefTuple( int refindex, int ref1, int
    ref2);
/*same, with the reference index instead of its name*/
```

Figure 10:
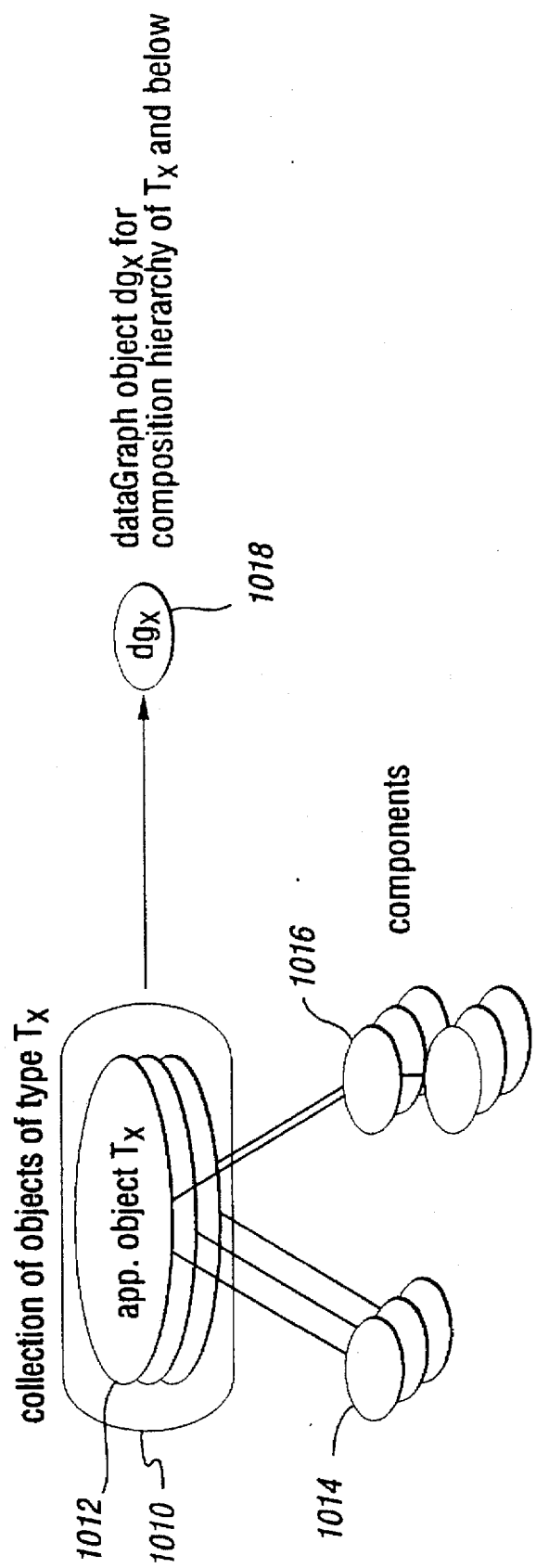

Referring now to FIG. 10, there is illustrated a collection of objects generally referred to by reference numeral 1010. The collection 1010 includes a plurality of objects 1012 of type $T_x$.

Each object 1012 may include one or more components 1014. Further, each object 1012 may include one or more components 1016. The collection of objects 1010 may be mapped to dataGraph 1018.

Figure 11:
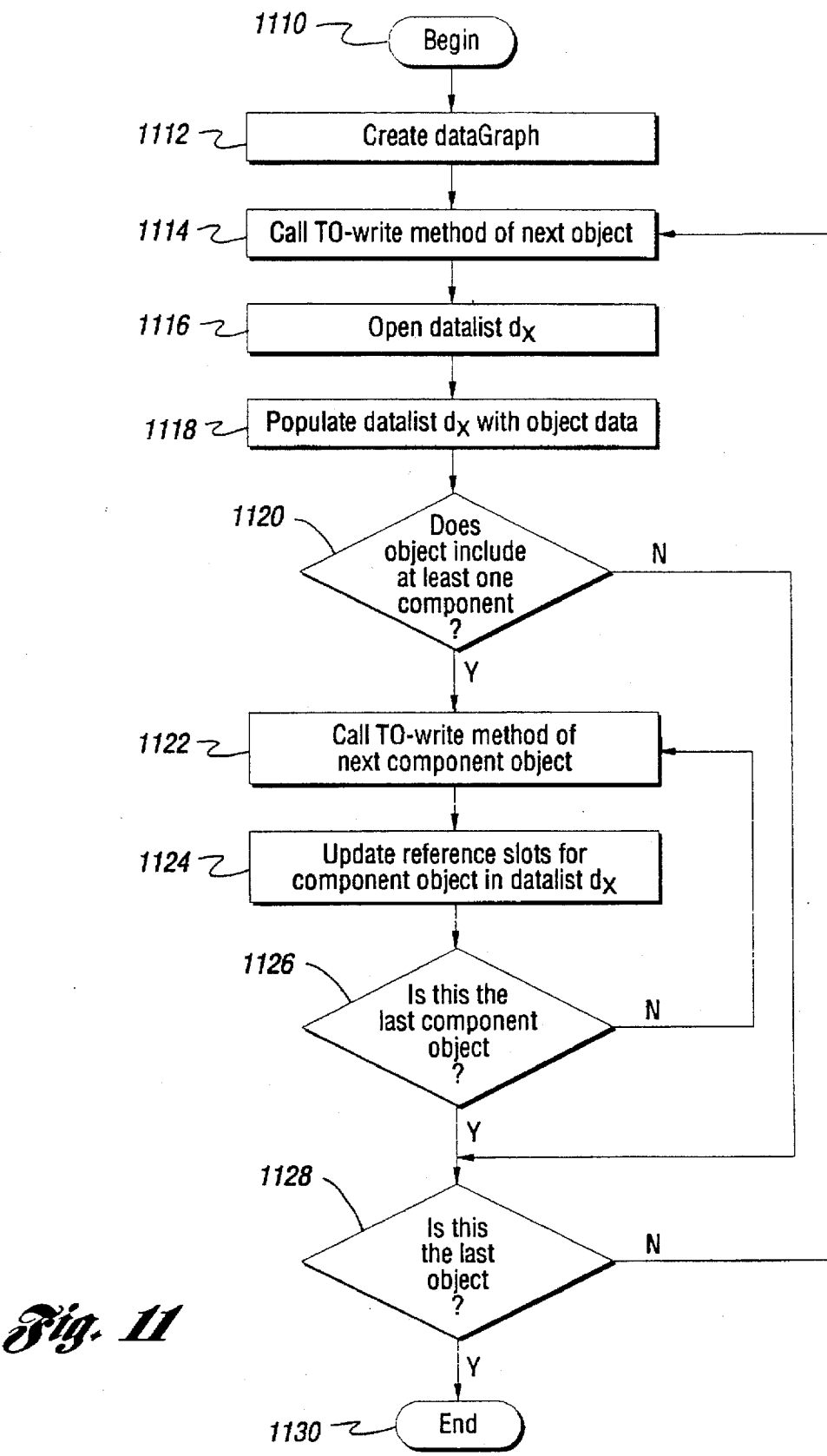

FIG. 11 is a flowchart illustrating the steps of the process to map a composition hierarchy to a TO using a depth-first technique. The process begins at block 1110.

As illustrated by block 1112, the first step of the process is creating an empty dataGraph object such as object 1018. The TO-schema of dataGraph 1018 must reflect the entire composition hierarchy below object 1012.

The next step, illustrated at block 1114, is to call the TO-write method for each object 1012 in the collection 1010. The next step, illustrated at block 1115 is the step of accessing the dataBlock object corresponding to the class describing object 1012.

Block 1116 illustrates the step of opening a datalist $d_x$. Block 1118 illustrates the step of populating datalist $d_x$ with object data of object 1012. As illustrated by block 1120, if object 1012 contains no components, flow skips to block 1128.

Steps 1122-1126 represent steps which apply to each component of object 1012. Block 1122 represents the step of calling the TO-write method of each component object of object 1012. Block 1124 represents the step of updating r-reference slots in datalist $d_x$ for each component. Block 1126 indicates that steps 1122 and 1124 are performed for every component object of object 1012.

Block 1128 represents a decision to process the next object 1012 in collection 1010. If less than all objects have been mapped, to the TO, the process resumes at block 1114. If all objects 1012 have been mapped to the TO, the process ends at block 1130.

Note that if there are cycles in the composition hierarchy—that is if a type object type T is recurrent among the types of its components—the index density property (IDP) is not guaranteed by the process that populates a single TO for such a hierarchy. This is because the same dataBlock would be affected at different levels of the recursive process. In this case, one must use another reference implementation or build several TOs.

Consider also the case where there are loops in the composition hierarchy. If one wants to maintain the IDP of the dataGraph implementation, one should use a breadth-first TO-write algorithm.

Mapping from a TO to an application object

Figure 12:
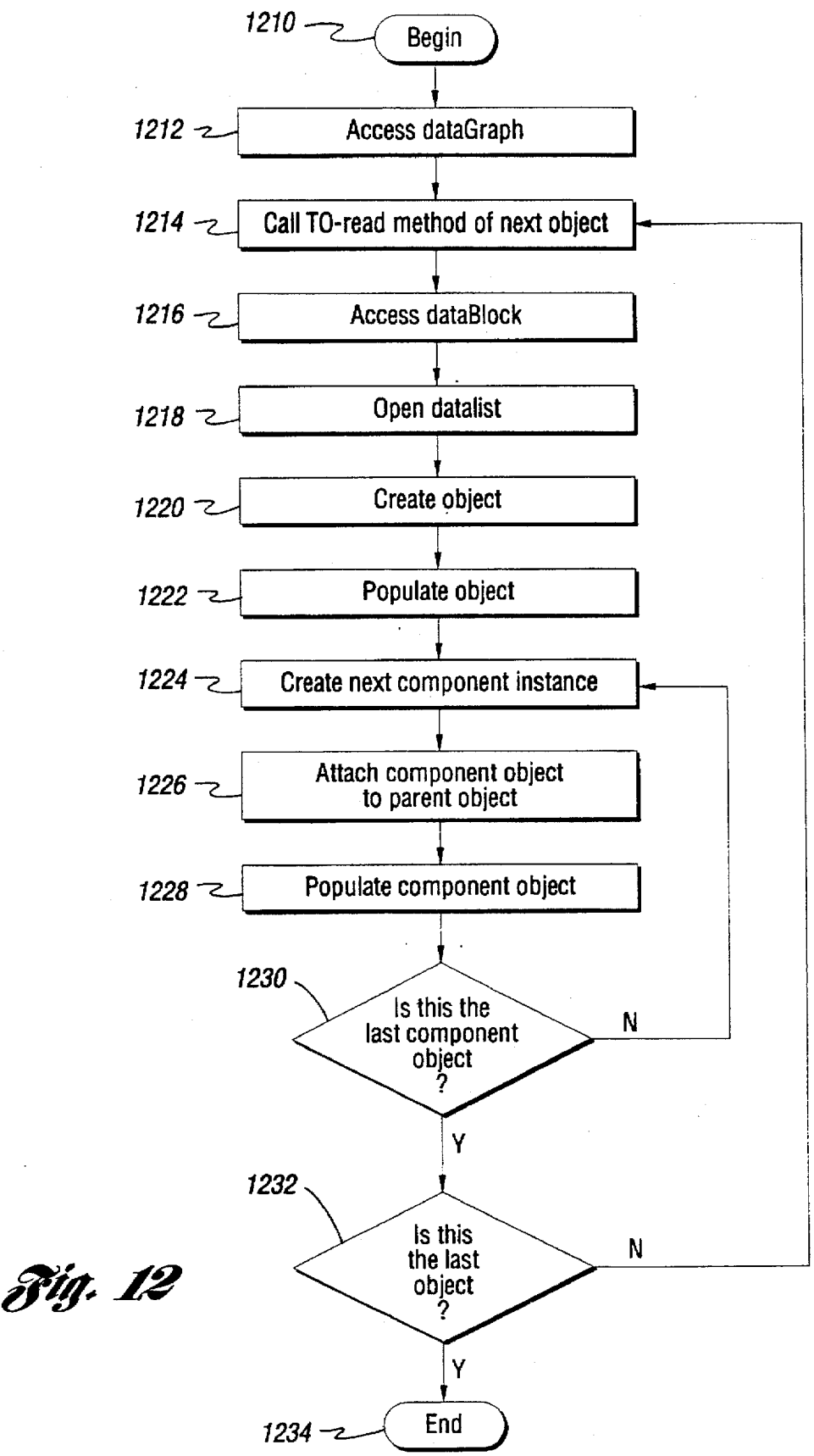

Referring now to FIG. 12, there is illustrated the steps of the process to populate an application object from a TO. In order to populate itself, each application object (called object of interest) must traverse its composition hierarchy.

Two TO-read methods must be defined to accommodate the two cases which may occur. In the first case, only the core (empty) application object of interest exists. Its components have not yet been created. In the second case, the object of interest and all its components have been created but not populated.

The first case is described herein as it is the more difficult case to deal with. Further, it is the more likely case to occur since the number of components cannot always be known—especially in case of collections.

A TO-read method for an application object will implement process illustrated in FIG. 12. The process begins at block 1210. The next step, as illustrated at block 1212, is accessing the dataGraph object corresponding to the composition hierarchy.

Next, as shown at block 1214, the process includes the step of calling the TO-read method of each object 1012 of collection 1010. Block 1216 shows that the next step is accessing the dataBlock object corresponding to the class described in the dataGraph object.

Block 1218 represents the next step of opening each datalist of the dataBlock. The steps of creating the object and populating the object are represented by blocks 1220 and 1222, respectively.

Blocks 1224-1230 represent steps which are performed on each component of the object. Block 1224 represents the step of creating an instance of each component. Block 1226 represents the step of attaching each component to its parent. Block 1228 represents the step of populating the component using data from the datalist. The decision to continue until all components have been processed is described by block 1230.

Decision block 1232 represents the decision to continue processing objects until all objects have been mapped from the TO. The process ends with the step described by block 1234.

The methods for accessing the datalists of a dataBlock are:

```
int dataBlock::GetRecordCount()
/* return the total number of datalists in the dataBlock */
SVList*dataBlock::GetRecord(int index)
/* returns the datalist of index number "index" */
```

The methods for accessing reference information are:

```
int dataBlock::GetAttColNumber()
/* return the number of slots in the datalist: the other ones
    (after are reference slots */
int dataBlock::GetRefNumber()
/* return the number of r-references from this dataBlock
    */
string dataBlock::GetRefName(int refnum)
/*given a r-reference number (from 1 to n), returns its
    name*/
string dataBlock::GetRefType(int refnum)
/*given a r-reference number (from 1 to n), returns its
    type*/
int dataBlock::GetRefdbkindex(int refnum)
/*given a r-reference number (from 1 to n), returns the
    index of the dataBlock that is referred to */
int dataBlock::GetRefTupleIndex(int refnum)
/*given a r-reference number (from 1 to n), returns the
    index in the datalists of this dataBlock where the
    corresponding pair of reference slots is */
```

Mapping From A TO To A Relational Model

In the preferred embodiment, the set of stored procedures interface on the database side. This means that there are stored procedures that match a particular application object model. While this is a violation of the independence datastore/application object-model, this is the price to pay for efficient database access.

In addition it provides some higher level of data integrity at the object level. Consequently, the storage of object data in a RDBMS requires some additional constraints that a database administrator (DBA) would not want enforced at a lower level or for conventional database users.

With stored procedures, the storage of a TO requires a single RPC call to a single stored procedure, which can in turn ruse local sub-procedures. While the binding process of parameters results in additional overhead, plain SQL (embedded SQL) entails more communication overhead and renders the application or the object server more dependent on the database technology.

The preferred embodiment maps a TO to a set of arrays. The arrays replicate the TO structure and are directly fed to the stored procedure. The recipient stored procedure must be able to parse the dataGraph arrays or pass subsections of it like dataBlocks to other stored procedures.

The dataGraph method to convert a list based TO representation into an array-based representation is:

int dataGraph::FormalToArray()

Charin_par_array [MAX_ITEMS], intarray_width_ptr, int** array_length _ptr, int&mainbd_nb_rows, int&max_nb_rows, int scope=SCOPE_ALL);

/*in_par_array (output) is an array that will contain the TO-data. Each element (item-array) is in turn an array of strings that represents all the instances of a given TO-attribute or of a TO-reference slot.

array_width_ptr (output) is an array of integer points that holds the maximum size associated to each "item-array" for its string elements.

array_length_ptr (output) is an array of integer points that holds the maximum number of elements in each "item-array".*/

Mapping From Relational Data To TO

Relational data can be defined as a homogeneous set of tuples that is produced by an SQL SELECT statement. This set of tuples may actually result from a join across several tables. The mapping process must therefore provide some means to partition the attributes of a tuple into groups, each group being relevant to a TO-entity.

Consider a simplified version of the previous example in which application object CO has components of type OI.

A relational schema that maps straightforwardly to this object model could contain two entities called CUST_ORD and ORD_ITEM, with a relationship one-to-many from CUST_ORD to ORD_ITEM. Assume that the attributes of the object CO have their counterpart in the entity CUST_ORD and that the attributes of the object OI have their counterpart in the entity ORD_ITEM.

One of the retrieval operations associated with CO consists of retrieving a complete customer order including components. The select statement of the corresponding SQL query or stored procedure will be of the form: "SELECT CUST_ORD*,ORD_ITEM*FROM . . ."

The resulting relational data is a unique set of tuples (cartesian product resulting from the join) where the values of the selected CO attributes are duplicated for each OI. If built with the appropriate structure, the TO associated with such a request will partition vertically the resulting tuples in "sub-tuples" relevant to order_item. If several customer orders were retrieved at once, the TO would also partition the order items tuples into groups attached to each corresponding customer order.

Operations On Tuples

Any processing beyond the tuple partitioning and tuple referencing involved in TO creation, like derived or computed slots, is considered as application specific and is relevant to the second step of the mapping that takes the TO as input. For example if the CO class has an additional instance attribute called "oicount" that represents the number of order items currently associated to the order, its value would be computed during the conversion from TO to object unless the SQL query itself returns the corresponding count value.

In order to build a TO from a set of tuples, the TO-schema is interpreted as operations to be performed by the mapper. These operations include vertical slitting, merging, ordering and referencing.

Vertical splitting of a set of tuples consists of partitioning the attributes of the resulting tuples or columns into groups. The partitioning is not restricted to the usual mathematical sense. The groups may overlap each other, and their union does not need to vertically cover all the query result.

A group corresponds to a dataBlock. A dataBlock is usually intended to match an object class in the object model. In this example, since there is a straightforward mapping from object to database entity, the partitioning reflects the original two tables (CUST_ORD and ORD_ITEM) from where the query result has been obtained. The partitioning defines which attribute in a tuple maps to which TO-attribute. This partitioning is performed using the "column" slot of the TO-attributes.

The merging operation consists of removing duplicate tuples in each dataBlock. Such redundancy may occur when splitting the result of a join or semi-join.

The ordering operation is based on relationships between dataBlocks called TO-relationships. These TO-relationships are introduced to create a partial order among them. The dataBlocks are ordered as a directed acyclic graph (DAG).

Although ordering is typically intended to reflect the composition hierarchy of the corresponding object classes in the object model, it could correspond to other kinds of relationships. The root dataBlock, called the focus of the TO, corresponds to the class that will handle the TO first. In this example, it is the higher level composed object customer_order.

The referencing operation identifies when a dataBlock d1 has a TO-relationship to a dataBlock d2. In such a case, each tuple of d1 is referencing the tuples of d2 that correspond to it. These references are called r-references. These r-references implement the TO-relationship at tuple level.

Figure 13:
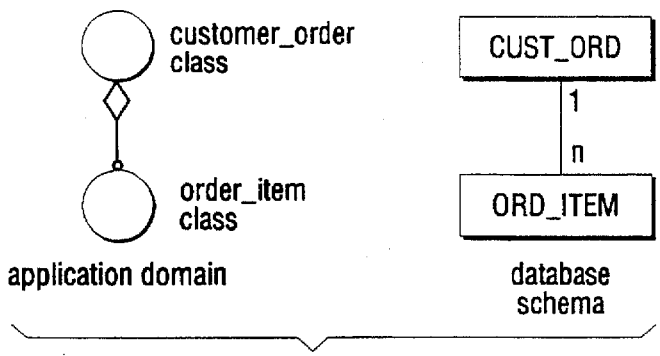
FIG. 13 is a block diagram illustrating example classes in an application domain and corresponding tables of a relational database.

Referring now to FIG. 13, there is illustrated the example classes CO and OI of the application domain and the corresponding tables customer_order and order_item of the example relational database.

Figure 14:
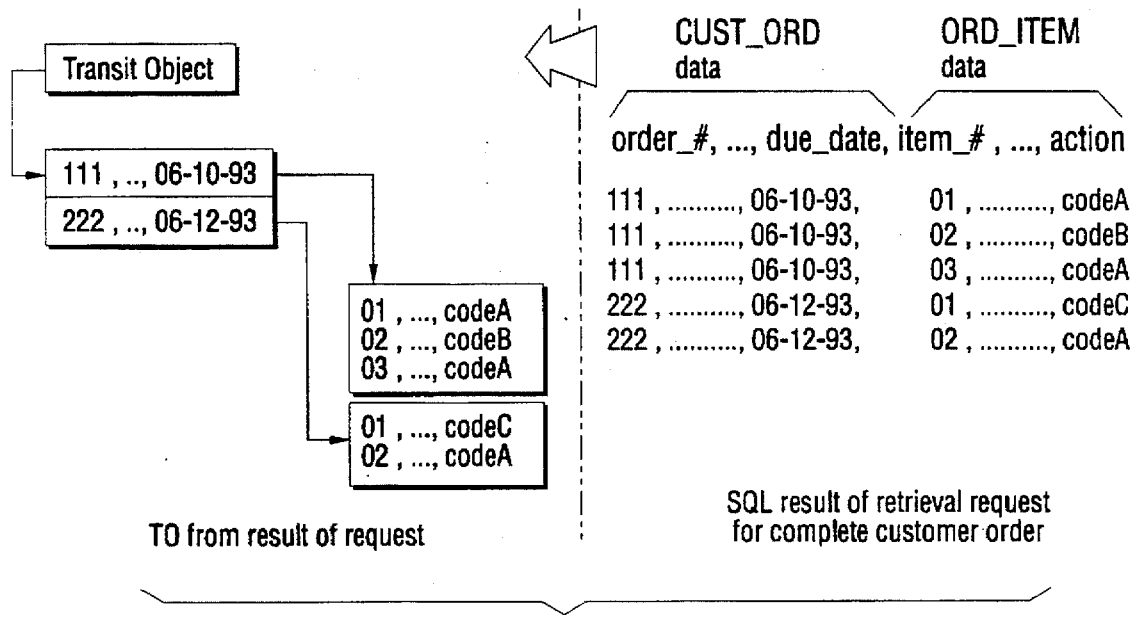

Referring now to FIG. 14, there is illustrated an SQL retrieval result for a completed customer order. There is further illustrated a TO containing the equivalent information. The TO includes one dataBlock for CO data and one dataBlock for OI data.

The Mapping Algorithm

Figure 15:
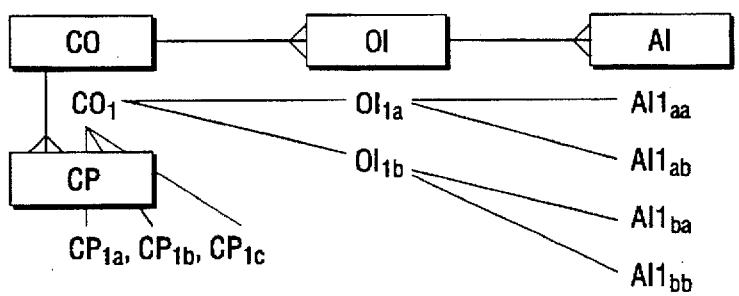
FIG. 15 is a block diagram illustrating the structure of an example relational database.

Consider the database illustrated in FIG. 15. A customer order is stored in the relational database, in the following form: a CO tuple called $CO_1$, three CP tuples called ($CP_{1a}$, $CP_{1b}$, $CP_{1c}$), two OI tuples called ($OI_{1a}$, $OI_{1b}$), each of them related to two AI tuples: ($AI_{1aa}$, $AI_{1ab}$) for $OI_{1a}$, and ($AI_{1ba}$, $AI_{1bb}$) for $OI_{1b}$. This relational schema corresponds to a TO-schema with tables CO, CP, OI, AI.

In order to get all the data for the customer_order CO1 at once, one must perform an SQL query of the form:

```
SELECT CO.*,CP*,OL*,AI.*
FROM CO,CP,OI,AI
WHERE CO_id=1
AND outer_join(CO,CP)
AND outer_join(CO,OI)
AND outer_join(OI,AI)
```

The result of the SQL query will be of the following form where each line represents a tuple:

$CO_1, CP_{1a}, OI_{1a}, AI_{1aa}$
$CO_1, CP_{1a}, OI_{1a}, AI_{1ab}$
$CO_1, CP_{1a}, OI_{1b}, AI_{1ba}$
$CO_1, CP_{1a}, OI_{1b}, AI_{1bb}$
$CO_1, CP_{1b}, OI_{1a}, AI_{1aa}$
$CO_1, CP_{1b}, OI_{1a}, AI_{1ab}$
$CO_1, CP_{1b}, OI_{1b}, AI_{1ba}$
$CO_1, CP_{1b}, OI_{1b}, AI_{1bb}$
$CO_1, CP_{1c}, OI_{1a}, AI_{1aa}$
$CO_1, CP_{1c}, OI_{1a}, AI_{1ab}$
$CO_1, CP_{1c}, OI_{1b}, AI_{1ba}$
$CO_1, CP_{1c}, OI_{1b}, AI_{1bb}$

The algorithm to build this TO works in one pass over the set of tuples returned by the SQL query. The mapping process is implemented by the methods:

```
int dataGraph::PopulateFromArray(
   char**data array[MAX_ITEMS],
   int arraysize,
   int nbcolunms,
   int maxblocks=0);
int dataGraph::PopulateFromMultiArray(
   char**data array[MAX_BATCHES][MAX_ITEMS],
   int nbr_arrays,
   int arraysize,
   int lastarraysize,
   int nbcolunms,
   int maxblocks=0);
```

While the best mode for carrying out the invention has been described in detail, those familiar with the art to which this invention relates will recognize various alternative designs and embodiments for practicing the invention as defined by the following claims.

USW 0172 PUS         -38-                              1158

Appendix A

```
//---------------------------------------call dictionary file---------------------------------------

//-------------------------------------------call entry-------------------------------------------

//      one entry in the call dictionary contains:
//              -       application_name of the Call
//              -       classID (number) of the object class concerned by the Call
//              -       data server to access
//              -       stored procedure name in the database
//              -       type of call (CRUD)
//              -       dataGraph_info string for input parameters
//              -       dataGraph_info string for output parameters
//              -       dataGraph_info string for restricted view of output parameters
//      The Character strings that represent each item are terminated by |

//-------------------------------------------dataGraph info-------------------------------------------
//      The text description of a dataGraph_info is a characterstring
//      (called dataGraph_info string) structured as a concatenation of
//      dataBlock_info strings. A dataBlock_info string is terminated by ^

//      A dataBlock_info string is structured as follows :
//              classID:colmax(
//                      [#]atype:attname:size:index,
//                      ...
//                      @reftype:refname:rclassID:refindex,
//                      ...)
//      where :
//      - classID is the integer number associated to the object class that
//              corresponds to this datablock.
//      - colmax is either a :
//              number -> total number of attributes columns (without refs)
//                      in the datablock
//              * -> total number of columns is = to greatest index
//              A -> col_indices are absolute, then do not use in output dgraph!
//      - atype is the type of the attribute of this column (type name not impos[cutoff]
//              if preceded with (#), this attribute is part of the key.
//      - attname is the attribute name
//      - size is the maximum length (in bytes) of the ASCII string that represe[cutoff]
//              the value of an attribute.

//      - index is either a number, or *.
//              number -> an array column index where the attribute's values have
//                      to be fetched or stored (relative to first index assigned to this
//                      dataBlock in the array when colmax != A (each index must be smaller
//                      than the number in colmax)
//              * -> the index is deduced by the order where the attribute description
//                      appears in the dataBlock_info.
```

```
USW 0172 PUS              -39-
                                                                    1158
//    - reftype is a type of reference.  (for semantic modeling: e.g. associat[cutoff]
//         composition, inheritance...)
//    - refname is the name of the oriented relationship that connects
//         this dataBlock to another.
//    -rclassID is the classID of the dataBlock_info connected by this refere[cutoff]
//    -refindex : unused (just put star)

//-------------------------------------Warnings-------------------------------------
//    one entry must
//         - be made of consecutive lines (empty lines ignored)
//             but comment lines accepted
//         - start at the beginning of a line, tabs accepted.
//         - is separated from other entries by a line starting by $
//    WARNING:
//    The dataGraph_info for one dataBlock must specify
//    ALL its key slots (using #). If some key slots must not
//    be aprt of the dataBlock, but must be used to identify tuples,
//    put a minus (-#) before.
//    If no key slots are specified, no comparison between tuples
//    will occur : all tuples are taken as they are.

//    WARNING:
//    The maximum size of an entry (chars) is LINEBUFF_SIZE (in REE_global.h)

//    NOTE: the DATE size is set to 20 in order to accommodate the
//    most complete representation (string formats with hours / minutes).
//==============================CustomerOrder_pkg==============================
//--------------------------------------------------------------------------------
Get_CustomerOrder | 1080 | oral | CustomerOrder_pkgtype3.get_CustomerOrder_Core | R |
//        standard input DG:
1080:*(CHAR:COnumber1:20:*,)^|

//        standard output DG:
1080:*(#CHAR:order_number:20:*,
       CHAR:pl_customercode:12:*,
       CHAR:purchase_order:20:*,
       DATE:order_date:20:*,
       DATE:due_date:20:*,
       CHAR2:dd_origcode:2:*,
       CHAR6:dd_timeinter:6:*,
       CHAR6:status_code:6:*,
       CHAR1:type_code:1:*,
       DATE:completion_date:20:*,
       NUMBER:tot_charge:12:*,
       CHAR1:version_code:1:*,
```

USW 0172 PUS          -40-          1158

```
            CHAR12:custom_ctct:12:*,
            CHAR12:request_code:12:*,
            CHAR12:routing_code:12:*,
            DATE:release_date:20:*,
            DATE:app:12:*,
            CHAR:sls:12:*,
)^|
//      restricted view output DG:
^|
$
```

//------------------------------------------------------------------------------
Add_CustomerOrder | 1080 | oral | CustomerOrder_pkgtype3.add_CustomerOrder_Core | C |

```
//          standard input DG:
1080:*(#CHAR20:order_number:20:*,
        CHAR20:pl_customercode:12:*,
        CHAR:purchase_order:20:*,
        DATE:order_date:20:*,
        DATE:due_date:20:*,
        CHAR2:dd_origcode:2:*,
        CHAR6:dd_timeinter:6:*,
        CHAR6:status_code:6:*,
        CHAR1:type_code:1:*,
        DATE:completion_date:20:*,
        NUMBER:tot_charge:12:*,
        CHAR1:version_code:1:*,
        CHAR12:custom_ctct:12:*,
        CHAR12:request_code:12:*,
        CHAR12:routing_code:12:*,
        DATE:release_date:20:*,
        DATE:app:12:*,
        CHAR:sls:12:*,
        )^|

//      standard output DG: this is for getting back the POIDs
1080:*(#CHAR:order_number:20:*,)^|

//      restricted view output DG:
^|
```

USW 0172 PUS            -41-                    1158

```
//----------------------------------------------------------------------------------------
Add_OrderItem | 1090 | oral | CustomerOrder_pkgtype3.add_OrderItem_Core | C |

//           standard input DG:
1090:*(
             #INT:ord_item_no:3:*,
             #CHAR:order_number:20:*,
             CHAR:action:10:*,
             CHAR:kind:12:*,
             CHAR:name:20:*,
             CHAR:value:30:*,
             CHAR:chargecode:10:*,
             CHAR:referentType:8:*,
             CHAR:actionSource:1:*,
             CHAR:wfOperation:24:*,
             DATE:earliestDueDate:12:*,
             DATE:latestDueDate:12:*,
             CHAR:referentPointer:150:*,
             CHAR:operandPointer:150:*,
             )^|
//     standard output DG: main Order Item (this is for getting back the POIDs)
1090:*(
             #INT:ord_item_no:3:*,
             )^|
//     restricted view output DG:
^|
$ Get_OrderItem | 1090 | oral | CustomerOrder_pkgtype3.get_OrderItem_Core | R |
1090:*(
             #INT:ord_item_no:3:*,
             #CHAR:orderNumber:20:*,
             )^|
1090:*(
             #INT:ord_item_no:3:*,
             #CHAR:order_number:20:*,
             CHAR:action:10:*,
             CHAR:kind:12:*,
             CHAR:name:20:*,
             CHAR:value:30:*,
             CHAR:chargecode:10:*,
             CHAR:referentType:8:*,
             CHAR:actionSource:1:*,
             CHAR:wfOperation:24:*,
             DATE:earliestDueDate:12:*,
             DATE:latestDueDate:12:*,
             CHAR:referentPointer:150:*,
             CHAR:operandPointer:150:*,
             )^|
^|
$
```

```
USW 0172 PUS                    -42-                              1158

//-----------------------------------------------------------------------------
Add_Composed_COrder | 1080 | oral | CustomerOrder_pkgtype3.Add_CustomerOrder | C |

//       standard input DG:
1080:*(#CHAR20:order_number:20:*,
        CHAR20:pl_customercode:12:*,
        CHAR:purchase_order:20:*,
        DATE:order_date:20:*,
        DATE:due_date:20:*,
        CHAR2:dd_origcode:2:*,
        CHAR6:dd_timeinter:6:*,
        CHAR6:status_code:6:*,
        CHAR1:type_code:1:*,
        DATE:completion_date:20:*,
        NUMBER:tot_charge:12:*,
        CHAR1:version_code:1:*,
        CHAR12:custom_ctct:12:*,
        CHAR12:request_code:12:*,
        CHAR12:routing_code:12:*,
        DATE:release_date:20:*,
        DATE:app:12:*,
        CHAR:sls:12:*,
        @assoc:refoi:1090:*)^
1090:*(
        #INT:ord_item_no:3:*,
        #CHAR:order_number:20:*,
        CHAR:action:10:*,
        CHAR:kind:12:*,
        CHAR:name:20:*,
        CHAR:value:30:*,
        CHAR:chargecode:10:*,
        CHAR:referentType:8:*,
        CHAR:actionSource:1:*,
        CHAR:wfOperation:24:*,
        DATE:earliestDueDate:12:*,
        DATE:latestDueDate:12:*,
        CHAR:referentPointer:150:*,
        CHAR:operandPointer:150:*,
        )^|
^|
$
//-----------------------------------------------------------------------------
```

USW 0172 PUS     -43-                                    1158

Add_Composed_COrder | 1080 | oral | CustomerOrder_pkgtype3.Add_CustomerOrder | C |

//       standard input DG:
```
1080:*(#CHAR20:order_number:20:*,
        CHAR20:pl_customercode:12:*,
        CHAR20:purchase_order:20:*,
        DATE:order_date:20:*,
        DATE:due_date:20:*,
        CHAR2:dd_origcode:2:*,
        CHAR6:dd_timeinter:6:*,
        CHAR6:status_code:6:*,
        CHAR1:type_code:1:*,
        DATE:completion_date:20:*,
        NUMBER:tot_charge:12:*,
        CHAR1:version_code:1:*,
        CHAR12:custom_ctct:12:*,
        CHAR12:request_code:12:*,
        CHAR12:routing_code:12:*,
        DATE:release_date:20:*,
        DATE:app:12:*,
        CHAR:sls:12:*,
        @assoc:refoi:1090:*)^
1090:*(
        #INT:ord_item_no:3:*,
        #CHAR:order_number:20:*,
        CHAR:action:10:*,
        CHAR:kind:12:*,
        CHAR:name:20:*,
        CHAR:value:30:*,
        CHAR:chargecode:10:*,
        CHAR:referentType:8:*,
        CHAR:actionSource:1:*,
        CHAR:wfOperation:24:*,
        DATE:earliestDueDate:12:*,
        DATE:latestDueDate:12:*,
        CHAR:referentPointer:150:*,
        CHAR:operandPointer:150:*,
        )^|
```

//       standard output DG: this is for getting back to the POIDs
```
1080:*(#CHAR20:order_number:20:*,
        @assoc:refoi:1090:*)^
1090:*(#INT:ord_item_no:3:*,)^|
```

//       restricted view output DG:
```
^|
$
//------------------------------------------------------------------------
```

USW 0172 PUS          -44-                    1158

Get_Composed_COrder | 1080 | oral | CustomerOrder_pkgtype3.Get_CustomerOrder | R |

//    standard input DG:
1080:*(CHAR2:COnumber1:20:*,)^|

//    standard output DG:
1080:*(#CHAR20:order_number:20:*,
       CHAR20:pl_customercode:12:*,
       CHAR20:purchase_order:20:*,
       DATE:order_date:20:*,
       DATE:due_date:20:*,
       CHAR2:dd_origcode:2:*,
       CHAR6:dd_timeinter:6:*,
       CHAR6:status_code:6:*,
       CHAR1:type_code:1:*,
       DATE:completion_date:20:*,
       NUMBER:tot_charge:12:*,
       CHAR1:version_code:1:*,
       CHAR12:custom_ctct:12:*,
       CHAR12:request_code:12:*,
       CHAR12:routing_code:12:*,
       DATE:release_date:20:*,
       DATE:app:12:*,
       CHAR:sls:12:*,
       @assoc:refoi:1090:*,
)^
1090:*(
       #INT:ord_item_no:3:*,
       #CHAR:order_number:20:*,
       CHAR:action:10:*,
       CHAR:kind:12:*,
       CHAR:name:20:*,
       CHAR:value:30:*,
       CHAR:chargecode:10:*,
       CHAR:referentType:8:*,
       CHAR:actionSource:1:*,
       CHAR:wfOperation:24:*,
       DATE:earliestDueDate:12:*,
       DATE:latestDueDate:12:*,
       CHAR:referentPointer:150:*,
       CHAR:operandPointer:150:*,
)^|

//    restricted view output DG:
^|

USW 0172 PUS        -45-        1158

Appendix B

```c
#ifndef mapbase_h
define mapbase_h include <stdlib.h>
include <stdio.h>
#include <stream.h>
#include <strings.h>
#include <OB_global.h>
include <OB_svlist.h> define LOOK_CLASSID 1
define LOOK_ATTS 2
define LOOK_REFS 3 define SLOT_SIZE 10
/* warning: if you change SLOT_SIZE, change also the corresponding sprintf formats ! */
define DBK_ITEM_SIZE 30 define SCOPE_ALL 0
define SCOPE_FIRST 1

/* ERRORS */
#define ERR_CREATE -1
#define ERR_MERGE -2
#define ERR_ASCII -3
#define ERR_ARRAY -4
#define ERR_NOROWS -5
#define ERR_POPULATE -6
define ERR_EXTEND -7 class REE_dataBlock;
class REE_dataGraph_info;

/*

A map_base is represented by a dataGraph.
A dataGraph is a group of dataBlocks that reference each other.
In fact, a set of relations over a set of dataBlocks.
   Each relation is represented by a multi=valued function:
        domain:sourcedbk --reference--> range:refdbk
   We assume that each referred set of items is stored consecutively.

A dataBlock is made of:
        - an identifier, which is the class-ID it is concerned with
```

```
          in the client model
        - a header
        - a list of records (item-record, or i-record)
A header is made of:
        - a list of slot names
          (of attributable slots and of reference slots)
        - a corresponding list of slot types
          (for attributes: their types,
           for references: class-ID of referred dataBlocks)
e.g.:     att1nm -> att2nm -> att3nm -> ref1nm -> ref1nm -> ref2nm -> ref2nm
          att1typ-> att2typ-> att3typ-> refID1 -> index1 -> refID2 -> index2
          record_item:
                      ...    ...    ...   start1   number1   start2   number2

An record-item (r-item) is a list made of:
        - a sub-list of attributes values
        - a sub-list of reference values
          each reference value contains:
            · an index to the referred sub-block of data in the referred dataBlock
            · the number of referred record-items
*/
/*==============================================================*/
class REE_dataBlock {
/*==============================================================*/ public:
  REE_dataBlock(REE_dataBlock *dbk);
  REE_dataBlock(string datatext = NULL);
  REE_dataBlock(     IVList *key_header,
                     SVList *anm_header,
                     IVList *aty_header,
                     IVList *asz_header,
                     IVList *aix_header,
                     int classID,
                     int attnumber,
                     int columnmax);
  ~REE_dataBlock();
  void CleanData();

int Add_Ref(string refname, string refdbk);
int Add_Ref(string refname, int refdbkID);

SVList *Get_nameHeader()
        {return name_header;}
int RecordItemLength()
        {return name_header->GetSize() ; }
IVList *Get_typeHeader()
        {return type_header;}
```

```
IVList *Get_indexHeader()
        {return index_header;}
IVList *Get_sizeHeader()
        (return size_header;}
IVList *Get_keylistHeader()
        {return keylist_header;}
int GetRefStartIndex()
        {return refstart;}
int GetAttColNumber()
        {return refstart;}
int GetRefNumber()
        {return refnumber;}
int GetColMax()
        {return colmax;}
int GetSizeRow()
        {return sizerow;}
int GetRecordCount()
        {return recordcount;}
HVList *GetRecord(int index)
        {return recordcount ? (HVList *) ((*lrecord_item) [index]) : NULL; }
HVList *GetLastRecord()
        {return recordcount ? (HVList *) (lrecord_item->Last()) : NULL; }
HVList *GetFirstRecord()
        {return recordcount ? (HVList *) (lrecord_item->First()) : NULL; } void AddRecord(HVList *recorditem) {
  lrecord_item->Append(recorditem);
    recordcount++;
    } string GetTupleStringSlot(int pos, int rowindex = 0) {
  return ((string) ((*(GetRecord(rowindex)))[pos]));
}
string GetTupleDateSlot(int pos, int rowindex = 0){
  return ((string) ((*(GetRecord(rowindex)))[pos]));
}
double GetTupleDoubleSlot(int pos, int rowindex = 0){
  return (*(double *)(*(GetRecord(rowindex)))[pos]));
}
int GetTupleIntSlot(int pos, int rowindex = 0) {
  return (*(int *)(*(GetRecord(rowindex)))[pos]));
} string GetTupleStringSlot(string name, int rowindex = 0);
string GetTupleDateSlot(string name, int rowindex = 0);
double GetTupleDoubleSlot(string name, int rowindex = 0);
int GetTupleIntSlot(string name, int rowindex = 0);
```

```
string GetRefName(int refnum)
  {return (string)((*name_header)[refstart + (refnum-1)*2]);}
int GetRefType(int refnum)
  {return (*(int *)((*type_header)[refstart + (refnum-1)*2]));}
int GetRefdbkindex (string refname)
  {int i; return (((i=GetRefNum(refname))>-1)?
            (*(int *)(*index_header)[refstart + GetRefNum(refname) - 1])):
            -1);}
int GetRefdbkindex(int refnum)
  // return index in dataGraph of the referred block for this reference
  {return (*(int *)((*index_header)[refstart + refnum -1]));}
int GetRefTupleIndex(int refnum)
  {return (refstart + (refnum-1)*2);}
int GetRefSlots(char *refname,
           int index_tuple,
           int& index1_slot,
           int* index2_slot);
int ShiftRef( int iref, int shiftvalue );
VList *GetRecordList()
  {return lrecord_item; }
void AddRecordList (VList *lrecord2)
  {lrecord_item->AppendList(*lrecord2);
  recordcount = lrecord_item->GetSize();}
int GetRefTupleIndex(string refname);
int GetRefNum(string refname);
int SetRefIndex(int refdbkID, int index);
int GetID(){ return blockID;}
int AddDataRefCount()
  {return(++datarefcount) ; } int GetSize();
int GetTotalCol()
  {return (colmax + 2*refnumber);}
int FillNullRef(int recordstart, int numref);
int FormatToArray(
           void **in_par_array[MAX_ITEMS],
           int startcol,
           int *array_width,
           int *array_type,
           int *array_length);

/* ------datagraph composition */ int SetRefTuple ( char *refname, int ref1, int ref2);
int SetRefTuple ( int refindex, int ref1, int ref2);
int OpenTuple();
int AddSlotToTuple (void *slot, int type);
int CloseTuple(); // return tuple index
```

```
USW 0172 PUS                    -49-                          1158

/* ASCII conversions */ string FormatToASCII (char *current);
char *CreateFromASCII(string str);
int CreateFrom ASCIIfile(FILE *DF);

/* ------display */ void Display();

/* error handling */ int CreateError(int errorcode);
  void SetErrorMessage(char *mstr)
    { errormsg = strdup (mstr) ; } private:

/* index in the header / record-items where the references start
        = also the number of attribute fields */
int refstart;

/* the maximum number of columns referred to by the index list.
        This is used when converting back the dataBlock into arrays.
        It does not count the references slots */
int colmax;

/* number of references */
int refnumber;

/* number of record-items (without header) */
int recordcount;

/* associated classID */
int blockID;

/* list of records (called record-items) */
VList *lrecord_item;

/* one list of strings pointers (names & type) for the header */
SVList *name_header;

/* three lists of integers pointers (type code, size & index)
    for the header */
IVList *type_header;
IVList *size_header;
IVList *index_header;
```

```
USW 0172 PUS              -50-                                    1158

/* an integer list that contains indices of key attributes
       Each index is an index in the name_header list */
    IVList *keylist_header;

/* the total size of a row, in bytes */
    int sizerow;

/* for populating: current tuple not yet added */
    HVList *currenttuple;
    int currenttupleind;

/* refcount for reuse of datapart, in case destructor */
    int datarefcount;

char *errormsg;
    int errorstatus;

};

/*===========================================================================*/
class REE_dataGraph_info {
/*===========================================================================*/ public:

REE_dataGraph_info();
    REE_dataGraph_info(string dataGprofile);
    ~REE_dataGraph_info();
    int Add_infoBlock(string dataGprofile,
                IVList *indexlist = NULL);
    int ExtendWith_infoGraph (int infoblocksourceID,
                            REE_dataGraph_info *subdg,
                            string refname,
                            string reftype=0);
    int ExtendWith_infoBlock (int infoblocksourceID,
                            string dataGprofile,
                            string refname,
                            string reftype=0);

/* set the indexlist to numbers found in inputlist,
       otherwise, numbers start from slotattcount */
    int SetColIndices( int startcol,
                IVList *indexlist ,
                IVList *inputlist = NULL);

/* add startcol to all colindices of the dataGraph_info */
    int SetColIndices( IVList *indexlist,
                int startcol = 0);
```

```
USW 0172 PUS                    -51- int GetSizeTypeVector(int **buff_sizevector,
                        int **buff_typevector);
        int GetBlockCount()
          { return blockcount;}
        int GetSlotattcount()
          {return slotattcount;}
        int GetColoMax(int idbk)
          {return *(int *)((*listcolmax)[idbk]);}
        int GetAttNumber(int idbk)
          {return *(int *)((*listattnumber)[idbk]);}
        int GetColAttNumber();
        int GetRefNumber(int idbk)
          {return ( ((SVList *)((*attname_headers)[idbk]))->GetSize()-
                    *(int *)((*listattnumber)[idbk]) );}
        int GetRefNumber();
        int GetOneStartCol(int dbkindex)
          {return *(int *)((*liststartcol)[dbkindex]) ;}
        int GetIndex(int classID)
          {return (listclassIDs->IndexOF(classID)); }
        int GetClassID(int idbk)
          {return *(int *)((*listclassIDs)[idbk]);}
        SVList *GetAttNameHeader(int idbk)
          {return (SVList *)((*attname_headers)[idbk]);}
        IVList *GetAttTypeHeader(int idbk)
          {return (IVList *)((*atttype_headers)[idbk]);}
        IVList *GetAttSizeHeader(int idbk)
          {return (IVList *)((*attsize_headers)[idbk]);}
        IVList *GetAttIndexHeader(int idbk)
          {return (IVList *)((*attindex_headers)[idbk]);}
        IVList *GetAttKeyHeader (int idbk)
          {return (IVList *)((*keyindexlist_headers)[idbk]);}
        VList *GetListAttNameHeaders()
          {return attname_headers; }
        VList *GetListAttTypeHeaders; }
          {return atttype_headers; }
        VList *GetListAttSizeHeaders()
          {return attsize_headers; }
        VList *GetListAttIndexHeaders()
          {return attindex_headers; }
        VList *GetListKeyIndexHeaders()
          {return keyindexlist_headers; }
        IVList *GetListClassIDs()
          {return listclassIDs; }
        IVList *GetListStartCol()
          {return liststartcol; }
        IVList *GetListAttNumber()
          {return listattnumber; }
        IVList *GetListColMax()
```

```
      {return listcolmax; }
int GetTotalColmax()
      {return totalcolmax; }
void Display();

private:

int ParseInLists(string inString,
                 int& classID,
                 IVList *keyindexlist,
                 SVList *attname_header,
                 IVList *atttype_header,
                 IVList *attsize_header,
                 IVList *attindex_header,
                 int& attnumber);

/* each index in the following lists corresponds to a dataBlock */

IVList *listclassIDs;
    /* each element: a classID for a dataBlock */

IVList *liststartcol;
    /* list of int*. For each dbk, column number of its first column:
       i.e. to which column it corresponds in the source stringdatablock.

WARNING: contains one more item than dblock numbers ! */
IVList *listcolman;
    /* each element: maximum column index for the indices of the dbk */
IVList *listattnumber;
    /* tells how many attributes (without references) */

VList *attname_headers;
    /* each element: a list of attribute names for a dataBlock.
       references slots: reference name */
VList *atttype_headers;
    /* each element: a list of attribute types for a dataBlock.
       references slots: reference type (e.g. assoc) */
VList *attsize_headers;
    /* each element: a list of attribute sizes for a dataBlock.
       references slots: referred dbkID (class ID of the referred dbk) */
VList *attindex_headers;
    /* each element: a list of attribute indices for a dataBlock.
       used when converting the dataBlock from and to arrays.
       This list can be set at default values by the constructor.
       references slots: referred dbk index in the DGinfo list */
VList *keyindexlist_headers;
    /* tells what attributes in each attname_header
       are to be used as identifiers */
```

```
      USW 0172 PUS              -53-                          1158

/* how many Block_infos in there */
int blockcount;

/* how many slots already in there */
int slotattcount;

int totalcolmax;

};
/*===============================================================*/
class REE_dataGraph {
/*===============================================================*/ public:

REE_dataGraph (REE_dataGraph *dg);
REE_dataGraph (string datatext = 0);
REE_dataGraph (REE_dataGraph_info *datagen,
               IVList *orederedIDs = NULL);
~REE_dataGraph();
void CleanData();

int CreateError(int errorcode);
int GetErrorStatus()
   { return errorstatus; }
char* GetErrorMessage()
   {return errormsg; }
void SetErrorMessage(char *mstr)
   {errormsg = strdup(mstr); }
int Compare(REE_dataGraph_info *datagen
             int& standarddbknb);
int ExtendDataGraph(REE_dataGraph *dg);
/* return dataBlock and index info of a referred cluster,
   for a given >record-item, reference name> */
SLVist *Get_nameHeader(int dbkind)
   {return ((REE_dataBlock *)((*1dataBlock)[dbkind]))->Get_nameHeader(); }
IVList *Get_typeHeader(int dbkind)
   {return ((REE_dataBlock *)((*1dataBlock)[dbkind]))->Get_typeHeader(); }
IVList *GetListStartCol()
   {return liststartcol;}
int GetOneStartCol(int dbkindex)
   {return *(int *)((*liststartcol)[dbkindex]);}
int GetSizeTypeVector(int **buff_sizevector,
             int **buff_typevector);
int GetMainRecordCount()
   {return ((REE_dataBlock *)((*1dataBlock) [0]))->Get_RecordCount(); }
```

```
int PopulateFromArray(
        void **data_array[MAX_ITEMS],
        int arraysize,
        int nbcolumsn,
        int *typevect,
        int maxblocks=0);
int PopulateFromMultiArray(
        void **data_array[MAX_BATCHES][MAX_ITEMS],
        int nbr_arrays,
        int arraysize,
        int lastarraysize,
        int nbcolumsn,
        int *typevect,
        int maxblocks=0);
int PopulateOneDBKFromArray(
            void **data_array[MAX_ITEMS],
            int arraysize,
              // number of rows in the array
            int *typevect,
              // type of each column
            REE_dataBlock *targetdbk,
              // target datablock to populate: the root for next ones
            int startcol
              // the col we start from in the array
            );

int PopulateOneDBKFromArray(
            void **data_array[MAX_ITEMS],
            int arraysize, // number of rows in the array
            int *typevect,
              // type of each column
            REE_dataBlock *referringdbk,
                  // referring datablock that contains the scoping info
            int referringind,
                  // which reference is concerned in referringdbk (real [CUT OFF??]
            int recordstart,
                  // which record we start from in rootdbk
            REE_dataBlock *target datablock to populate
                  // target datablock to populate
            int startcol
                  // the col we start from in the array
            );

int PopulateFromArrayFromRootDBK(
        void **data_array[MAX_ITEMS],
              // number of rows in the array
        int arraysize,
        int *typevect,
```

```
                // type of each column
        int rootdbkindex,
        int recordstart,
                // in case dataGraph superset (bigger than standard)
        int maxblocks);

/* incremental building of a MIO */

/*
int OpenCluster (int fromclassID,
            char *refname);
int CloseCluster (void *slotref = 0 );
*/
int Add_dataBlock( REE_dataBlock *dbk);
REE_dataBlock * Get_dataBlock ( int i)
        {return((REE_dataBlock *)((*1dataBlock) [i]));}
int GetDBIndex(int classID)); }
        {return (dbkIDs->IndexOf(classID)); }
int Get_dataBlockID( int i )
        {return (*(int*)((*dbkIDs) [i]));}
int IsEmpty()
        {return( ((REE_dataBlock *)((*1dataBlock) [0]))->GetRecordCount() == 0);}
int GetCount()
        {return dbkcount;}
REE_dataBlock *GetReferred_dataBlock(REE_dataBlock *dbk, int refnum)
        {return Get_dataBlock(dbk->GetRefdbkindex(refnum));} int GetSize ();
IVList *GetdbkIDs()
        { return dbkIDs; }
VList *GetLDataBlocs()
        { return 1dataBlock; }
int GetSlotAttCount()
        {return slotattcount; }
int GetSlotAllCount ()
        { return slotallcount;

/* ASCII conversin */ int CreateFromASCII(string datatext);
string FormatToASCII();
int CreatFromASCIIfile(string filename);
int FormatToASCIIfile (string filename);

/* Array conversions */ int FormatToArray()
        void **in_par_array[MAX_ITEMS],
```

```
            int **array_width_ptr,
            int **array_type_ptr,
            int **array_length_ptr,
            int &maindbk_nb_rows,
            int &max_nb_rows,
            int scope=SCOPE_ALL);

int FreeBufferARray(
        void **data_array[MAX_ITEMS],
        int dbitems);
void DisplayBlockFromArray(int numblock,
                    void **dg_array[MAX_ITEMS],
                    int nbrows);
void DisplayArray(void **dg_arrays[MAX_ITEMS],
            int nbarray_items,
        int *inbuff_szvector,
        int *inbuff_length);
voidDisplayArray(void **dg_arrays[MAX_BATCHES][MAX_ITEMS],
        int nbr_batches,
        int nbarray_items,
        int *inbuff_szvector,
        int *inbuff_length);
void Display();

private:

void UpdateIndexReferencesTo(int classID, int index);

int dbkcount;
int slotattacount;
int slotallcount;
IVList *dbkIDs;
    /*   list of dataBlocsk IDs (related to class ID) */
IVList *liststartcol;
    /*   list of int*. For each dbk, column number of its first column:
            i.e. to which column it corresponds in the source stringdatablock.
            WARNING: contains one more item than dblock numbers ! */
VList *ldataBlock;
    /*   list of REE_dataBlock pointers */ int errorstatus;
char *errormsg;

};
```

Appendix C

```
/* ===================datagraph after ASCII translation =================== */

/* dataGraph ASCII separators */ define CHAR_ITEM_SEPARATOR        '^'        /* for ending fields */
define STRING_ITEM_SEPARATOR      "^"
#define RECORD_SEPARATOR           0x1e       /* ^^ for ending tuples or lists */
#define GROUP_SEPARATOR            0x1d       /* ^] for ending dataBlocks */
#define FILE_SEPARATOR             0x1c       /* ^\ for ending dataGraphs */

/* ASCII conversion protocol for the DataGraph */ dgf^_NumberOfDatablocks ^_^^
      ListOfDataBlocksID^_^^ dbk^_ClassIDofTheDatablock^_IndexFirstReference^_NumberOfReferences^_
            NumberOfRecords^_NumberOfKeyAttributes^_ColumnMaxOfAttributes^_^
      List OfKeysIndciesInAttributeList^^
      ListOfATtributeNames^^
      ListOfAttributeTypes^^
      ListOfAttributeIndices^^

ListOfAttributeValuesForOrder836^^
      ListOfAttributeValuesForOrder837^^
      ListOfAttributeValuesForOrder838^^
      ListOfAttributeValuesForOrder839^^
            ^]^\

/* ASCII translation : an example
   (tabs and new lines have been insert for more readability */ dgf^_1^_^^
      1080^_^^
dbk^_1080^_16^_0^_4^_1^_16^_^^
      0^_^^
      order_number^_pl_customercode^_purchase_order^_order_date^_due_date^_
            dd_origcode^_dd_timeinter^_status_code^_type_code^_
            completion_date^_tot_charge^_version_code^_custom_ctct^_
            request_code^_routing_code^_release_date^_^^
      CHAR20^_CHAR20^_CHAR20^_DATE^_DATE^_CHAR2^_CHAR6^_CHAR6^_CHAR1^_DATE^_
            NUMBER^_CHAR1^_CHAR12^_CHAR12^_CHAR12^_DATE^_^^
      21^_21^_21^_21^_21^_3^_7^_7^_2^_21^_13^_2^_13^_13^_13^_21^_^^
      1^_2^_3^_4^_5^_6^_7^_8^_9^_10^_11^_12^_13^_14^_15^_^^
      836^_cid1^_purcahse1^_10-10-1993^_08-17-1993^_ab^_123456^_010110^_C^_
            08-16-1993^_00080^_1^_servicerepA^_rc1^_rou1^_08-16-1993^_^^
```

USW 0172 PUS        -58-                    1158

```
837^_cid2^_purchase2^_CA^_09-17-1993^_ab^_123456^_010110^_C^_
     09-16-1993^_00080^_1^_servicerepb^_rc1^_rou1^_08-16-1993^_^^
838^_cid3^_purchase3^_TBD^_10-17-1993^_ab^_123456^_010110^_C^_
     10-16-1993^_00080^_1^_servicerepC^_rc1^_rou1^_08-16-1993^_^^
839^_cid4^_purchase4^_NA^_11-17-1993^_ab^_123456^_010110^_C^_
     11-16-1993^_00080^_1^_servicerepD^_rc1^_rou1^_08-16-1993^_^^
          ^}^\
```

What is claimed is:

1. In a data processing system including a processor, a memory, a client object broker ("COB") responsible for object data stored in an object-oriented application object, a communication server and a server object broker ("SOB") responsible for relational data stored in a relational database, a method for mapping data from a plurality of objects to the relational database, the method comprising:

generating in the memory a transit object corresponding to a generic intermediate form of data independent of the object data and the relational data, the transit object including at least one dataBlock object;

populating the at least one dataBlock object of the transit object based on the data of the plurality of objects stored in the COB;

transmitting the transit object from the COB to the SOB using the communication server;

populating a data structure based on the at least one dataBlock object; and populating the relational database based on the data structure.

2. The method of claim 1 wherein the plurality of objects is a compositional hierarchy including parent objects and component objects, the step of populating the at least one dataBlock object includes the steps of:

traversing the component objects of each parent object;

opening a datalist for each component object; and populating the datalist based on each component object.

3. The method of claim 2 wherein the step of traversing is performed in depth-first order.

4. The method of claim 1 wherein the data structure is an array.

5. The method of claim 1 wherein the data structure is a list.

6. In a data processing system including a processor, a memory, a client object broker ("COB") responsible for object data stored in an object-oriented application object, a communication server and a server object broker ("SOB") responsible for relational data stored in a relational database, a method for mapping data from the relational database to a plurality of objects, the method comprising:

generating in the memory a transit object corresponding to a generic intermediate form of data independent the object data and the relational data, the transit object including at least one dataBlock object;

generating in memory a data structure;

populating the data structure based on the data of the relational database stored in the SOB;

populating the at least one dataBlock object of the transit object based on the data structure;

transmitting the transit object from the COB to the SOB using the communication server; and populating the plurality of objects based on the at least one dataBlock object.

7. The method of claim 6 wherein the plurality of objects is a compositional hierarchy including parent objects and component objects, the step of populating the at least one object includes the steps of:

generating a component object of a parent object;

attaching each component to the parent;

populating the component object based on data from the dataBlock object.

8. The method of claim 7 wherein the step of generating is performed in depth-first order.

9. The method of claim 6 wherein the data structure is an array.

10. The method of claim 6 wherein the data structure is a list.

* * * * *